United States Patent [19]

Maisch

[11] 3,882,953
[45] May 13, 1975

[54] COMPENSATION OF SIDE WIND FORCES TENDING TO UNDESIRABLY MOVE A VEHICLE LATERALLY

[75] Inventor: Wolfgang Maisch, Schwieberdingen, Germany

[73] Assignee: Robert Bosch G.m.b.H., Stuttgart, Germany

[22] Filed: Nov. 5, 1973

[21] Appl. No.: 413,059

[30] Foreign Application Priority Data
Nov. 13, 1972 Germany............................ 2255602

[52] U.S. Cl............................. 180/79.2; 80/77.1
[51] Int. Cl............................................... B62d 5/06
[58] Field of Search.......... 180/79.2 R, 79.1, 79.2 D

[56] References Cited
UNITED STATES PATENTS

| | | | |
|---|---|---|---|
| 2,987,135 | 6/1961 | Harvey........................... | 180/79.2 R |
| 2,990,902 | 7/1961 | Cataldo........................... | 180/79.2 R |
| 3,011,579 | 12/1961 | Milliken et al................. | 180/79.2 R |
| 3,744,587 | 7/1973 | Schimkat....................... | 180/79.2 R |
| 3,782,490 | 1/1974 | Schimkat........................... | 180/79.1 |

Primary Examiner—Robert R. Song
Assistant Examiner—John A. Pekar
Attorney, Agent, or Firm—Michael S. Striker

[57] ABSTRACT

In a vehicle having turnable wheels, in an arrangement of the type operative for compensating against forces, such as side wind forces, tending to undesirably move the vehicle laterally, of the type including an arrangement for effecting an automatic compensatory turning of the vehicle wheels in a direction and to an extent counteracting the tendency of such forces to undesirably move the vehicle laterally, the speed of the vehicle is determined and the extent of the automatic compensatory turning of the vehicle wheels is modified in dependence upon the determined vehicle speed. As one possibility, a vehicle-speed-dependent upper limit is placed upon the extent of the compensatory turning of the vehicle wheels. Advantageously, there is an inverse relationship between the vehicle-speed-dependent upper limit and the vehicle speed. The relationship may be approximately inversely proportional or only inverse.

8 Claims, 2 Drawing Figures

COMPENSATION OF SIDE WIND FORCES TENDING TO UNDESIRABLY MOVE A VEHICLE LATERALLY

BACKGROUND OF THE INVENTION

The invention relates to arrangement for compensating against the tendency of side wind forces, and other such forces, to undesirably move a vehicle laterally, and more particularly to arrangements of that type which effect a compensatory turning of the vehicle wheels automatically supplementing the turning of the vehicle wheels brought about by the vehicle drive using the vehicle steering wheel.

Such arrangements are already known, for example in German published application No. 1,810,720. According to this known arrangement, when the lateral forces resulting from side wind tend to move the vehicle laterally, a servo motor is coupled with the steering gear train of the steering mechanism. The servomotor provides a compensatory steering torque superimposed upon that provided by the driver using the vehicle steering wheel.

The known arrangements operate independently of vehicle speed. This has the disadvantage that the compensatory torque at high vehicle speeds may be too large, and at low vehicle speeds may be too small, so that the vehicle may drive off the road.

SUMMARY OF THE INVENTION

It is accordingly the general object of the present invention to provide a side wind compensation arrangement which is not characterized by the serious disadvantage mentioned above.

This object, and others which will become more understandable from the following description, can be met according to one advantageous concept of the invention by providing, in a vehicle having turnable wheels, in an arrangement of the type operative for compensating against forces tending to undesirably move the vehicle laterally, particularly for compensating against side wind forces tending to undesirably move the vehicle laterally, of the type including means for effecting an automatic compensatory turning of said vehicle wheels in a direction and to an extent counteracting the tendency of such forces to undesirably move the vehicle laterally, an arrangement comprising, in combination, speed-determining means for determining the speed of the vehicle, and compensation-modifying means connected to the speed-determining means and connected to the means for effecting an automatic compensatory turning of the vehicle wheels, and operative for modifying the extent of such automatic compensatory turning of the vehicle wheels in dependence upon the vehicle speed.

According to a further advantageous concept of the invention, a vehicle-speed-dependent upper limit is placed upon the extent to which the compensatory turning of the vehicle wheels is to proceed. Advantageously there is an inverse relationship between such vehicle-speed-dependent upper limit and the vehicle speed, i.e., when the vehicle speed rises the maximum permissible extent of the compensatory turning movement decreases, and vice versa. It is also advantageous to establish an approximately inversely proportional relationship between the just-mentioned vehicle-speed-dependent upper limit and the vehicle speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
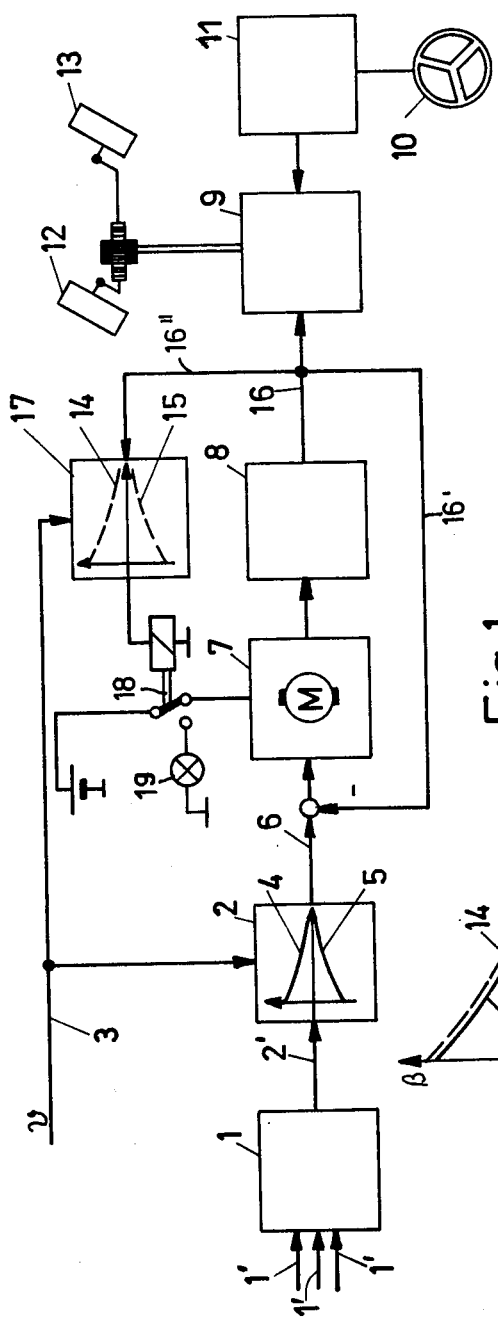
FIG. 1 is a schematic diagram of a side wind compensation arrangement.

Reference numeral 1 designates a unit which receives several input signals 1', which may for example be indicative of the lateral acceleration in the front of a vehicle, and the two input signals of the differential gear arrangement 9. The unit 1, whose construction does not per se form part of the present invention and is a matter of routine skill, generates an output signal 2' indicative of the amount of automatic compensatory turning movement of the vehicle wheels 12 appropriate for the detected wind, or other, conditions.

The command signal 2' is applied to the input of a compensation-modifying or compensation-limiting means 2, which will either pass the command signal 2', or an output signal proportional thereto, or which will cut down the value of the command signal 2'. It will be noted that the limiting means 2 has an additional input connected to a speed-signal line 3, which in turn may be connected to the output of any conventional means for determining vehicle speed, such as a tachometer or speedometer-type arrangement.

Figure 2:
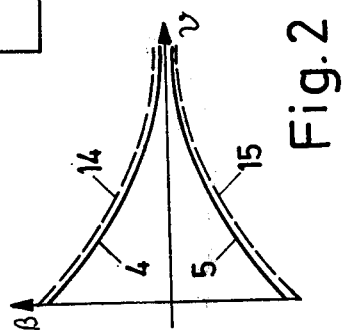
FIG. 2 depicts in graphical form aspects of the operation of the arrangement shown in FIG. 1.

The relationship established between the vehicle speed $v$ and the magnitude of the command signal 2' is graphically depicted in FIG. 2. The vehicle speed $v$ is plotted along the horizontal axis, and the magnitude $\beta$ of the command signal 2' is plotted along the vertical axis. So long as the magnitude $\beta$ of the compensation command signal 2' lies in the range intermediate the curves 4 and 5, the command signal applied to the input of the limiting means 2 will be passed unaltered to the output of the limiting means 2 in the form of an output signal 6. However, if the magnitude of the compensation command signal 2' lies outside the range between the curves 4 and 5, then the magnitude of the output signal 6 corresponding to such input signal will have a value equal to the magnitude of the curves 4, 5 at the prevailing vehicle speed $v$. Clearly, if the vehicle speed $v$ is low, compensation command signals 2' of relatively high magnitude will pass through the limiting means 2 unaltered. On the other hand, at higher vehicle speeds $v$, only compensation command signals 2' of relatively low magnitude will pass through the limiting means 2 unaltered. The internal circuitry of the limiting means 2 is a routine matter for persons skilled in the art, and in particular for persons skilled in the analog computer art where the synthesis of such input-output relationships is very common practice.

It will be noted that, as graphically depicted by the curves 4, 5, there is an inverse relationship between the vehicle velocity $v$ and the magnitude of the compensation command signal 2'. In other words, as the vehicle speed $v$ increases, the maximum permissible magnitude of the command signal $2'$ decreases, and vice versa. As one possibility, the relationship in question can be an approximately inversely proportional one. Alternatively, the relationship can be an approximately hyperbolic one. As a still further possibility, the curves 4 and 5 could exhibit discontinuities.

The output signal 6 of the limiting means 2 constitutes a compensation command signal, limited in magnitude in dependence upon vehicle speed, and representative of the angle through which the steering motor 7 is to turn to effect the requisite compensatory turning of the vehicle wheels 12, 13, in order to counteract the tendency of the side wind or other forces to push the vehicle laterally. In the illustrated embodiment the steering motor 7 is an electric motor; however it could also be a motor of different type, for example a motor driven by pressure fluid.

In particular the magnitude-limited compensation command signal 6 is applied to a summing junction at the input of the motor 7. Connected to the output shaft of the motor 7 is a reduction gear arrangement 8. Connected to the output shaft 16 of the reduction gear arrangement 8 is a feedback transducer, symbolically depicted as a feedback line $16'$. Feedback transducer $16'$ feeds back to the summing junction a signal indicative of the extent of angular rotation of the output shaft 16 of the reduction gear arrangement 8. When the signals applied to the summing junction are equal, rotation of the steering motor 7 terminates.

The output gear 16 of the reduction gear arrangement 8 is connected to one input shaft of a differential gear arrangement 9. The other input shaft of the differential gear arrangement 9 is connected to the output shaft of the steering gear train 11. The input shaft of the steering gear train 11 is connected to the driver's steering wheel 10. The output shaft of the differential gear arrangement 9 is connected to a rack-and-pinion steering arrangement for turning the vehicle wheels 12 and 13.

FIG. 2 depicts an additional pair of curves 14, 15 respectively located somewhat above and below the curves 4, 5 discussed with respect to the limiting means 2 of FIG. 1. If the actual angular position of the output shaft 16 of the reduction gear arrangement 8 falls outside the range of values located intermediate the curves 14, 15, as a result of system malfunction for example, then the entire compensating arrangement is taken out of operation.

To this end, a variable-threshold threshold switch arrangement 17 is provided. The input ot threshold switch 17 is connected to the output shaft 16 of the reduction gear arrangement 8 via a rotary-position transducer $16''$, shown in the drawing as a feedback line. The threshold switch 17 has a further input for receipt of the speed signal $v$ via line 3. In the event the magnitude of the rotary-position-indicating signal applied to the switch 17 falls outside the range intermediate the curves 14, 15 for the prevailing value of the vehicle speed, a relay 18 is activated to disconnect the steering motor 7 from the power supply, and to instead connect the power supply to a warning device 19.

The circuit details of the variable-threshold threshold switch 17, like those of the speed-dependent limiter 2 are matters of routine design skill, particularly for persons working in the analog computer art where the synthesis of the input-output relationships in question is very common practice.

It will be understood that each of the elements described above, or two or more together, may also find a useful application in other types of circuits and constructions differing from the types described above.

While the invention has been illustrated and described as embodied in an arrangement for counteracting the effects of side wind upon a vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is;

1. In a vehicle having turnable wheels, in an arrangement of the type operative for compensating against forces tending to undesirably move the vehicle laterally, particularly for compensating against side wind forces tending to undesirably move the vehicle laterally, of the type including means for effecting an automatic compensatory turning of said vehicle wheels in a direction and to an extent counteracting the tendency of such forces to undesirably move the vehicle laterally, an arrangement, comprising, in combination, speed-determining means for determining the speed of said vehicle; and compensation-limiting means connected to said speed-determining means and connected to said means for effecting an automatic compensatory turning of said vehicle wheels, and operative for establishing a vehicle-speed-dependent upper limit upon the extent of said automatic compensatory turning of said vehicle wheels.

2. In a vehicle as defined in claim 1, wherein said compensation-limiting means comprises means operative for establishing an inverse relationship between the vehicle speed and said upper limit of the extent of said automatic compensatory turning of said vehicle wheels.

3. In a vehicle as defined in claim 2, further including means for terminating operation of said means for effecting an automatic compensatory turning of said vehicle wheels in the event that the extent of such compensatory turning exceeds said upper limit by more than a predetermined amount.

4. In a vehicle as defined in claim 1, wherein said compensation-limiting means comprises means operative for establishing a substantially inversely proportional relationship between the vehicle speed and said upper limit of the extent of said automatic compensatory turning of said vehicle wheels.

5. In a vehicle as defined in claim 4, further including means for terminating operation of said means for effecting an automatic compensatory turning of said vehicle wheels in the event that the extent of such compensatory turning exceeds said upper limit by more than a predetermined amount.

6. In a vehicle as defined in claim 1 further including means for terminating operation of said means for effecting an automatic compensatory turning of said vehicle wheels in the event that the extent of such compensatory turning exceeds a predetermined extent.

7. In a vehicle as defined in claim 1, further including means for terminating operation of said means for effecting an automatic compensatory turning of said vehicle wheels in the event that the extent of such compensatory turning exceeds a variable vehicle-speed-dependent value.

8. In a vehicle as defined in claim 1, further including means for terminating operation of said means for effecting an automatic compensatory turning of said vehicle wheels in the event that the extent of such compensatory turning exceeds said upper limit by more than a predetermined amount.

* * * * *